(12) United States Patent
Coldren et al.

(10) Patent No.: US 10,247,122 B1
(45) Date of Patent: Apr. 2, 2019

(54) CONTROL SYSTEM FOR TURBOCHARGED ENGINE SYSTEM AND OPERATING METHOD FOR SAME

(71) Applicant: Caterpillar Inc., Peoria, IL (US)

(72) Inventors: Dana R Coldren, Secor, IL (US); Ryan Thomas Sunley, Washington, IL (US); Jianhua Zhang, Dunlap, IL (US); Lifeng Wang, Dunlap, IL (US)

(73) Assignee: Caterpillar Inc., Deerfield, IL (US)

(*) Notice: Subject to any disclaimer, the term of this patent is extended or adjusted under 35 U.S.C. 154(b) by 0 days.

(21) Appl. No.: 15/866,711

(22) Filed: Jan. 10, 2018

(51) Int. Cl.
| | | |
|---|---|---|
| *F02M 59/36* | (2006.01) | |
| *F02D 41/02* | (2006.01) | |
| *F02D 41/38* | (2006.01) | |
| *F02D 41/40* | (2006.01) | |
| *F02D 13/02* | (2006.01) | |
| *F02D 9/04* | (2006.01) | |
| *F02B 39/10* | (2006.01) | |

(52) U.S. Cl.
CPC .......... *F02D 41/0245* (2013.01); *F02B 39/10* (2013.01); *F02D 9/04* (2013.01); *F02D 13/0207* (2013.01); *F02D 41/3836* (2013.01); *F02D 41/401* (2013.01); *F02M 59/366* (2013.01); *F02D 2250/24* (2013.01)

(58) Field of Classification Search
CPC ............... F02D 41/0245; F02D 41/401; F02D 41/3836; F02D 41/0007; F02D 9/04; F02D 13/0207; F02D 2250/24; F02M 59/366; F02M 63/0235; F02B 39/10
USPC ........ 701/103, 110; 123/436, 457, 459, 510, 123/511; 60/601, 602, 603
See application file for complete search history.

(56) References Cited

U.S. PATENT DOCUMENTS

| | | |
|---|---|---|
| 6,842,689 B2 | 1/2005 | Andres et al. |
| 6,920,387 B2 | 7/2005 | Landes et al. |
| 7,174,714 B2 | 2/2007 | Algrain |
| 7,523,606 B2 | 4/2009 | Strauser et al. |
| 9,108,487 B2 | 8/2015 | Raffin et al. |
| 2013/0000602 A1 | 1/2013 | Coldren et al. |

*Primary Examiner* — Hai H Huynh
(74) *Attorney, Agent, or Firm* — Mattingly Burke Cohen & Biederman

(57) ABSTRACT

An engine control system is structured for operating a turbocharged engine system and includes an electronic control unit. The electronic control unit is structured to switch the engine system from operation in a parasitically loaded mode where fuel pressurized by a fuel pump is dumped to a low pressure space, to operation in a second mode, where an engine load increase is detected. Turbocharger lag in the engine system is limited during increasing the engine load by way of exhaust energy produced in response to the parasitic loading. Related methodology is disclosed.

20 Claims, 5 Drawing Sheets

CONTROL SYSTEM FOR TURBOCHARGED ENGINE SYSTEM AND OPERATING METHOD FOR SAME

TECHNICAL FIELD

The present disclosure relates generally to operating a turbocharged engine system, and more particularly to parasitically loading such an engine system to increase exhaust energy for limiting turbocharger lag.

BACKGROUND

Internal combustion engines are well known and widely used, in applications ranging from producing torque for vehicle propulsion or operation of pumps, compressors, or other stationary machinery, to electric power generation. In a typical internal combustion engine system a fuel such as a diesel distillate liquid fuel, a gaseous fuel like natural gas, gasoline, or still others is combusted with air in one or more engine cylinders according to well-known principles. Certain applications tend to require engine speed and engine load to be relatively dynamic in response to varying demands of the particular application. Adjustments to these and parameters can require or cause variation in the operation of various engine subsystems and/or other operating properties.

For example, increasing or decreasing engine load typically requires change to the amount, and potentially the pressure or timing of delivery, of fuel to the cylinders in each engine cycle. Other parameters such as turbocharger boost pressure, exhaust temperatures, and still others can vary in response to the fueling changes. Those skilled in the art will be familiar with the phenomenon known as turbocharger lag, where engine speed increase requests are associated with a delay time before engine torque increase is actually observed. In certain engine system designs such as a generator set or "genset," where an engine is coupled with an electric generator, turbocharger lag can contribute to suboptimal load acceptance performance or other shortcomings. U.S. Pat. No. 7,174,714 sets forth one known strategy where an electrical device coupled with a turbocharger can selectively power the turbocharger to reduce lag.

SUMMARY OF THE INVENTION

In one aspect, a method of operating a turbocharged engine system includes varying a position of a spill valve such that fuel pressurized by a fuel pump in the engine system is dumped by way of the spill valve to a low pressure space. The method further includes parasitically loading the engine system by way of the varying of the position of the spill valve. The method further includes increasing an engine load of the engine system, and limiting turbocharger lag during the increasing of an engine load of the engine system by way of exhaust energy produced in response to the parasitic loading of the engine system.

In another aspect, an engine control system includes an electronic control unit structured to vary a position of a spill valve between a closed position at which the spill valve blocks fluid communication between a fuel pump in the engine system and a low pressure space, and an open position. The electronic control unit is further structured to operate the engine system in a parasitically loaded mode by way of commanding varying the position of the spill valve between the closed position and the open position in a first timing pattern, such that fuel pressurized by the fuel pump is dumped to the low pressure space. The electronic control unit is further structured to operate the engine system in a second mode by way of commanding varying the position of the spill valve between the closed position and the open position in a second timing pattern. The electronic control unit is further structured to receive an engine load signal indicative of an increase in engine load of the engine system, and switch the engine system from operation in the parasitically loaded mode to operation in the second mode in response to the engine load signal. The electronic control unit is still further structured to limit turbocharger lag in the engine system during the increase in the engine load by way of exhaust energy produced in response to parasitic loading of the engine system during operation of the engine system in the parasitically loaded mode.

In still another aspect, an engine system includes an engine having an engine housing with a plurality of engine cylinders formed therein, and each of an exhaust manifold and an intake manifold structured to fluidly connect with the plurality of engine cylinders. The engine system further includes a turbocharger having a turbine and a compressor. A plurality of fuel injectors are each associated with one of the plurality of engine cylinders and each having an injection valve. The engine system further includes a plurality of fuel pumps each associated with one of the plurality of fuel injectors and having a pumping element and a spill valve movable between a closed position where the spill valve blocks the pumping element from a low pressure space, and an open position. The engine system further includes an electronic control unit in control communication with each of the plurality of fuel injectors and each of the plurality of fuel pumps. The electronic control unit is structured to operate the engine system in a parasitically loaded mode by way of commanding varying a position of the spill valve in at least one of the plurality of fuel pumps between the closed position and the open position, such that fuel pressurized by the corresponding fuel pump is dumped to the low pressure space. The electronic control unit is further structured to receive an engine load signal indicative of an increase in engine load of the engine system, and switch the engine system from operation in the parasitically loaded mode to operation in a second mode in response to the engine load signal. The electronic control unit is further structured to limit turbocharger lag in the engine system during the increase in the engine load by way of exhaust energy produced in response to parasitic loading of the engine system during operation of the engine system in the parasitically loaded mode.

DETAILED DESCRIPTION

Figure 1:
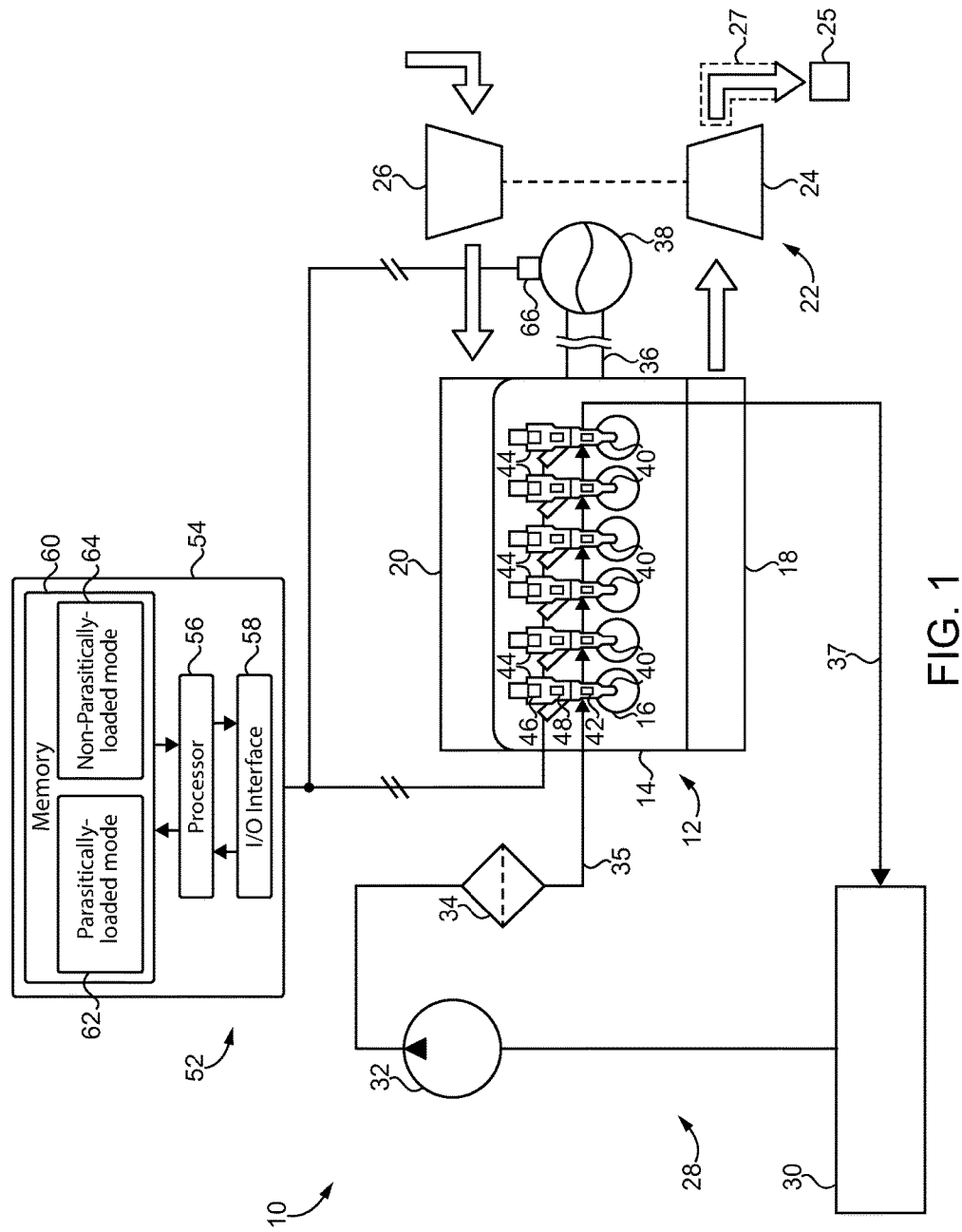
FIG. 1 is a diagrammatic view of an engine system, according to one embodiment.

Referring to FIG. 1, there is shown an engine system 10 according to one embodiment, and including an internal combustion engine 12 having an engine housing 14, with a plurality of engine cylinders 16 formed therein. Cylinders 16 are shown in an in-line configuration, but could be arranged in a V-configuration or any other suitable arrangement. A plurality of pistons (not shown) may be positioned one within each of cylinders 16 to rotate a crankshaft in a generally conventional manner. Engine 12 can include a direct-injected compression ignition diesel engine, however, the present disclosure is not thereby limited. Engine 12 further includes each of an exhaust manifold 18 and an intake manifold 20 structured to fluidly connect with engine cylinders 16. Engine system 10 may also include an electric generator 38 coupled with engine 12 by way of an engine output shaft 36. Engine system 10 also includes a turbocharger 22 having a turbine 24 structured to receive a flow of exhaust gases from exhaust manifold 18, and a compressor 26 structured to compress incoming air for delivery to cylinders 16 by way of intake manifold 20. Those skilled in the art will appreciate that additional components such as a filter for incoming air, an aftercooler positioned downstream of compressor 26, clutches, gearboxes, additional turbocharger stages, or still other components might be provided that are not shown in FIG. 1. In an implementation, fuel system 10 also includes an exhaust outlet conduit 27 that extends from turbine 24 to an exhaust outlet or tailpipe 25. Exhaust outlet conduit 27 can be structured to convey exhaust from turbine 24 directly to exhaust outlet 25 without exhaust aftertreatment. In other embodiments, exhaust outlet conduit 27 could include aftertreatment components such as a diesel oxidation catalyst, a NOx reduction mechanism such as a selective catalytic reduction or SCR module, a diesel particulate filter, for instance. As will be further apparent from the following description, engine system 10 is uniquely structured for reduced turbocharger lag during increasing engine load, such as an increase from an idle engine load to a higher engine load in response to an increased power output demand of electric generator 38.

Engine system 10 further includes a fuel system 28 having a fuel tank 30, a fuel transfer pump 32, a fuel filter 34, and a fuel conduit 35 structured to convey fuel to a plurality of fuel injectors 40 each associated with one of engine cylinders 16. Additional fuel pumps, additional fuel filters, and additional or alternative fuel supply conduit arrangements could be employed. In an implementation, fuel conduit 35 conveys fuel to one or more fuel passages (not numbered) through an engine head to supply each fuel injector 40 with fuel for injection into engine cylinders 16 to be combusted therein in a generally known manner. Fuel that bypasses fuel injectors 40, or that is spilled from fuel injectors 40 as further discussed herein, can be conveyed to a fuel return conduit 37 or a plurality of fuel return conduits that form a low pressure space (hereinafter "low pressure space 37") fluidly connected to fuel tank 30.

Each of fuel injectors 40 can include an electronically controlled injection valve 42. Each of fuel injectors 40 can further include or be coupled with a plurality of fuel pumps 44. It should be appreciated that discussion herein of fuel pumps 44 as part of, coupled with, or otherwise associated with fuel injectors 40, should not be taken to refer to any specific arrangement. Accordingly, mention of fuel pump 44 as part of fuel injector 40 should not be taken to mean that fuel pump 44 is necessarily attached to fuel injection components, for instance. Those skilled in the art will recognize the combination of fuel pumps 44 each being associated with one of fuel injectors 40 as a so-called unit pump arrangement. Each of fuel pumps 44 has a pumping element or plunger 46, and a spill valve 48. The terms "pumping element" and "plunger" are used interchangeably herein, although it will be appreciated other pumping element types could be used. Spill valve 48 is electronically controlled and movable between a closed position where spill valve 48 blocks the corresponding pumping element 46 from low pressure space 37, and an open position.

Engine system 10 further includes an electronic control unit 54 in control communication with each of fuel injectors 40 and each of fuel pumps 44, as further discussed herein. Electronic control unit 54 can include a standard engine control unit or module, or a separate computer control mechanism, operated in parallel with a standard engine control unit. Electronic control unit 54 can include an input/output or I/O interface 58, a processor 56, and a memory 60. Processor 56 can include any suitable microprocessor, microcontroller or other digital data processing device. Memory 60 can include RAM, ROM, FLASH, SDRAM, EPPROM, a hard drive, or any other suitable machine-readable storage medium. Recorded on memory 60 are computer executable instructions in the nature of operating instructions for controlling at least parts of engine system 10, namely, fuel system 28, including each electronically controlled injection valve 42 and each electronically controlled spill valve 48. Memory 60 stores computer executable instructions for operating engine system 10 in a parasitically loaded mode 62, and computer executable instruction for operating engine system 10 in a non-parasitically loaded mode 64. Those skilled in the art will appreciate that every engine system operates with certain parasitic loads at any given time. Accordingly, operation in parasitically loaded mode 62 versus operation in non-parasitically loaded mode 64 can be understood in the sense of parasitic loading to different relative extents, the significance of which will be apparent from the following description.

Figure 2:
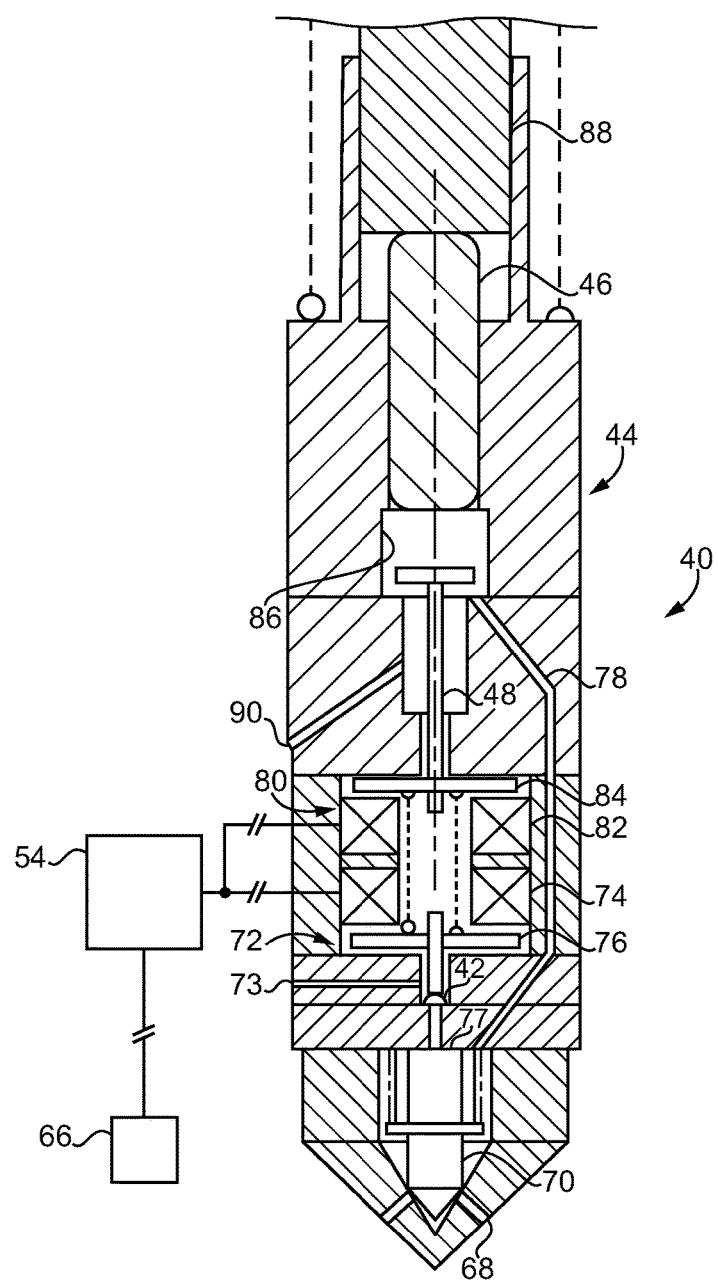
FIG. 2 is a sectioned side diagrammatic view of a fuel injector, according to one embodiment.

Referring also now to FIG. 2, there is shown one of fuel injectors 40, illustrating additional details. In fuel injector 40 an outlet check 70 is shown positioned as it might appear to block one or more nozzle outlets 68. Fuel injector 40 further includes electronically controlled injection valve 42, shown as it might appear positioned to block fluid communication between a low pressure outlet 73, which can fluidly connect to low pressure space 37, and a closing hydraulic surface 77 of outlet check 70. An electrical actuator 72 includes an armature 76 and a solenoid 74 that can be energized, de-energized, or otherwise varied in electrical energy state to adjust injection valve 42 to fluidly connect closing hydraulic surface 77 to low pressure outlet 73. The arrangement of outlet check 70, electrical actuator 72, and injection valve 42 shown in FIG. 2 is generally known. Fuel injector 40 also includes an electrical actuator 80 having an armature 84 and a solenoid 82. Each of solenoid 82 and solenoid 74 is electrically connected with electronic control unit 54. Armature 84 may be coupled with spill valve 48. Spill valve 48 is movable between an open position, and a closed position where spill valve 48 blocks pumping element 46 and a pressurization or pumping chamber 86 from a low pressure outlet/inlet 90 and low pressure space 37. Spill valve 48 is shown approximately as it might appear in the open position in FIG. 2. A nozzle passage 78 extends between pressurization chamber 86 and nozzle outlet 68, but is blocked from fluid communication with nozzle outlet 68 by way of outlet check 70 at the state of fuel injector 40 shown in FIG. 2. A tappet or the like 88 is shown in contact with plunger 46 and operated to reciprocate plunger 46 in a generally known manner. Accordingly, when spill valve 48 is closed plunger 46 can travel in a pressurization stroke (downward in the FIG. 2 embodiment) to increase a pressure of fuel in pressurization chamber 86, such that upon opening injection valve 42 and allowing outlet check 70 to lift, pressurized fuel can spray out of outlet(s) 68. When spill valve 48 is open, plunger 46 can travel in an intake stroke (upward in the FIG. 2 embodiment) to enable fuel to be drawn past spill valve 48 into pressurization chamber 86 by way of low pressure outlet/inlet 90 from low pressure space 37, or travel downward such that fuel is pushed out of pressurization chamber 86 by way of inlet/outlet 90 and back to low pressure space 37. As further discussed herein, appropriate control over the position of spill valve 48, and the position of injection valve 42 and thus outlet check 70, enables engine system 10 to be selectively parasitically loaded.

Figure 3:
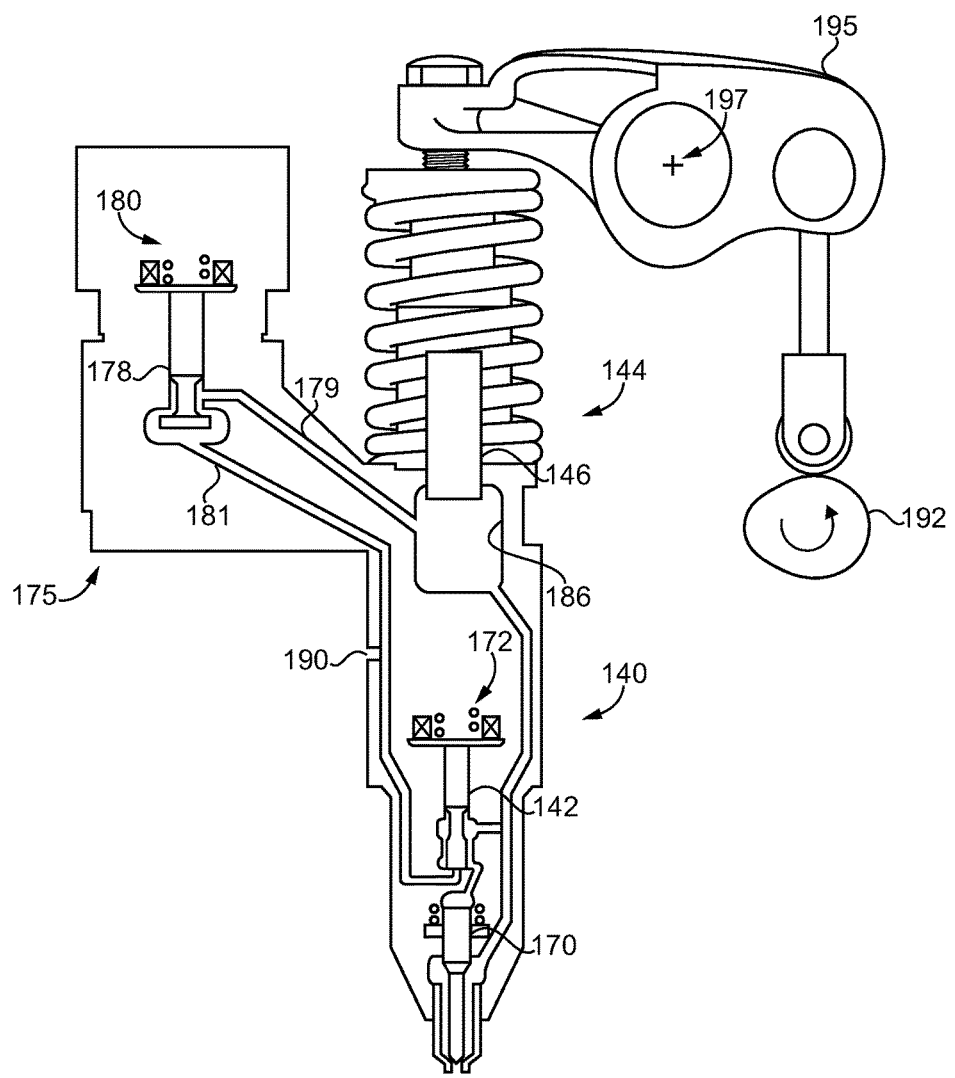
FIG. 3 is a side diagrammatic view of a fuel injector, according to another embodiment.

Turning to FIG. 3, there is shown a fuel injector 140, according to another embodiment having certain similarities with fuel injector 40 but also certain differences. Fuel injector 140 includes or is coupled with a fuel pump 144, including a pumping element 146 that is operated by way of a rocker arm 195 that tilts back and forth about an axis 197 in response to rotation of a cam 192. The foregoing embodiment of FIG. 2, could be operated by a similar rocker arm and cam arrangement, or by a cam lobe rotating directly against tappet 88, for instance. Fuel injector 140 also includes an outlet check 170, an injection valve 142, and an actuator 172. A pressurization chamber is shown at 186, and a low pressure inlet/outlet is shown at 190. Fuel injector 140 further includes a "sidecar" 175 wherein a spill valve 148 is positioned. An acutator 180 is provided for spill valve 148, the position of which can be varied to open or close fluid communications between a fuel passage 179 and a fuel passage 181. Operation of spill valve 148 is generally analogous to operation of spill valve 48 discussed with regard to the foregoing embodiment, with spill valve 148 being adjustable between a closed position at which low pressure inlet/outlet 190 is blocked from fluid communication with pressurization chamber 186, and an open position. An electronic control unit (not shown) would be electrically connected with electrical actuator 172 and electrical actuator 180, and can be substantially identical to electronic control unit 54 in the foregoing embodiment.

It should be appreciated that in the case of the embodiments of either of FIG. 2 or FIG. 3, fuel could be pressurized for sharing amongst more than one fuel injector. For instance, two, three, or potentially more fuel injectors could be fluidly connected to one fuel pump. Moreover, each individual fuel injector could be equipped with a pressure reservoir or pressure accumulator, for instance. Still further modifications within the general context of the present disclosure will be envisioned by those skilled in the art. It should also be understood that any description herein of the operation or construction of one of the embodiments of FIG. 2 and FIG. 3 can be understood by way of analogy to apply to the other of the embodiments of FIG. 2 and FIG. 3 and others contemplated herein, except where otherwise indicated. Accordingly, the previous as well as following descriptions focused on fuel injector 40 will be understood to refer also to fuel injector 140, and vice versa.

As discussed above, electronic control unit 54 is structured to vary a position of spill valve 48 between a closed position at which spill valve 48 blocks fluid communication between fuel pump 44/pressurization chamber 86 and low pressure space 37. Electronic control unit 54 may also be structured to vary a position of injection valve 42 between a closed position at which closing hydraulic surface 77 is blocked from low pressure inlet/outlet 73 and thus low pressure space 37, and an open position. In a "normal" operating mode, or an otherwise non-parasitically loaded mode, such as mode 64, during a pressurization stroke of plunger 46, electronic control unit 54 can command varying a position of injection valve 42, including opening injection valve 42 to enable outlet check 70 to lift to inject fuel by way of outlet 68. During an entirety of the pressurization stroke of pumping element 46, spill valve 48 can be maintained in a closed position. When operated in a parasitically loaded mode, such as mode 62, spill valve 48 can be opened during a pressurization stroke of plunger 46 such that fuel pressurized by fuel pump 44 is dumped to low pressure space 37. In an implementation, electronic control unit 54 is structured to operate engine system 10 in parasitically loaded mode 62 by way of commanding varying the position of spill valve 48 between the closed position and the open position in a first timing pattern, such that fuel pressurized by fuel pump 44 is dumped to low pressure space 37. Electronic control unit 54 is further structured to operate engine system 10 in a second mode, such as non-parasitically loaded mode 64, by way of commanding varying the position of spill valve 48 between the closed position and the open position in a second timing pattern that is different from the first timing pattern. The first timing pattern can include a spill valve opening timing that occurs during the pressurization stroke of plunger 46. The first timing pattern can further include a plurality of spill valve opening timings during the pressurization stroke. It will therefore be appreciated that spill valve 48 can be maintained closed long enough to enable pressure to build in pressurization chamber 86 in response to the downward travel of plunger 46. Spill valve 48 can then be opened for the remainder of the pressurization stroke, opened for a part of the remainder of the pressurization stroke, or opened and closed a plurality of times during the pressurization stroke in a given engine cycle so as to dump fuel pressurized by fuel pump 44 to low pressure space 37 a plurality of times in the engine cycle. The dumping of pressurized fuel can occur in an engine cycle of the associated engine cylinder 16 that includes injection of fuel, or an engine cycle where electronic control unit 54 commands maintaining outlet check 70 closed. It will be appreciated that maintaining outlet check 70 closed could enable a maximum parasitic load from the associated engine cylinder 16 as no combustion of fuel will occur. Thus, embodiments are contemplated where electronic control unit 54 commands varying of the position of injection valve 42 so as to inject fuel pressurized by fuel pump 44 into an engine cylinder 16 during operating engine system 10 in parasitically loaded mode 62, as well as scenarios where none of the fuel pressurized by fuel pump 44 is injected, at least in a given engine cycle, while operating in the parasitically loaded mode 62.

In some instances, one of engine cylinders 16 and the associated fuel injector 40 can be operated so as to parasitically load engine 12. In other instances, two, three, or all but one of engine cylinders 16 and associated fuel injectors 40 could be operated in this manner. The present disclosure also contemplates embodiments where one or more of engine cylinders 16 are parasitically operated, one or more are skip fired, and one or more are fired and operated normally, all at the same time. Skip firing could include maintaining spill valve 48 in the appropriate fuel pump 44 open throughout the engine cycle so that fuel is drawn into pressurization chamber 86 and pushed out of pressurization chamber 86 without any substantial pressurization occurring, with outlet check 70 being maintained closed the whole time. In still other instances, certain of engine cylinders 16 could be operated to parasitically load engine system 10 to different relative extents. A first one of engine cylinders 16 could be operated, for example, to spill pressurized fuel and with zero fuel injection, whereas a second engine cylinder 16 could be operated to spill pressurized fuel but with a relatively small amount of fuel injection, and other engine cylinders 16 operated with no spilling and a normal amount of fuel injection. Still further patterns could vary the number or time of spill/dump events amongst parasitically loaded engine cylinders.

As also noted above, electronic control unit 54 can be structured to operate engine system 10 in a second mode by way of commanding varying the position of spill valve 48 in a second timing pattern. Whereas the first timing pattern can include opening spill valve 48 during an intake stroke of plunger 46, closing spill valve 48 to allow some pressurization to occur, and then opening spill valve one or more times during the pressurization stroke of plunger 46, the second timing pattern can include opening spill valve 48 to enable fuel to be drawn into pressurization chamber 86, and then maintaining spill valve 48 closed throughout the pressurization stroke of pumping element 46. Electronic control unit 54 may output control commands to vary the position of spill valve 48 and the position of injection valve 42 in the selected mode based upon engine timing signals received from a conventional flywheel sensor, for instance.

Those skilled in the art will be familiar with the phenomenon known as turbocharger lag. In the case of a generator set, such as engine system 10 where a turbocharged internal combustion engine powers an electric generator, application of a sudden electrical load can necessitate speeding up the engine, however, the engine speed increase will typically be delayed until such time as sufficient exhaust energy is produced to speed up the turbocharger and thus increase boost pressure. The present disclosure contemplates parasitically loading engine system 10 as described herein, such that upon receipt of an engine load signal indicative of an expected increase in engine load of engine system 10, electronic control unit 54 can switch engine system 10 from operation in parasitically loaded mode 62 to operation in a second mode such as non-parasitically mode 64. Turbocharger lag in engine system 10 can be limited during increasing engine load by way of exhaust energy produced in response to the parasitic loading of engine system 10. It will be recalled that typically relatively little, or zero, fuel injection takes place in one or more of engine cylinders 16 during operating in parasitically loaded mode 62. As a result, no combustion energy is available from that engine cylinder 16, but energy is required to pressurize the fuel that is dumped. As a result, other engine cylinders are required to produce more combustion energy to compensate. This phenomenon can thus be understood as increasing the required power output of engine system 10 above what might otherwise be required. In the case of operating at an idle engine load, the additional exhaust energy produces higher exhaust temperatures that spin turbine 24 and therefore compressor 26 relatively faster than what might otherwise be observed. When the engine load signal, such as an engine load signal indicative of requested transitioning of engine system 10 from operating at idle engine load to operating at a higher engine load, is received, the lag that might otherwise be observed in turbocharger 22 tends not to occur or at least is reduced. As also noted above, the requested transitioning of engine system 10 can occur in response to an increased power output demand on electric generator 38. A sensor 66 can be coupled with generator 38 or with a controller for generator 38, for example, and produce a signal indicative of the requested change in power output demand. Determining an increased power output demand on generator 38 and/or increased engine load can be by any suitable means.

Figure 4:
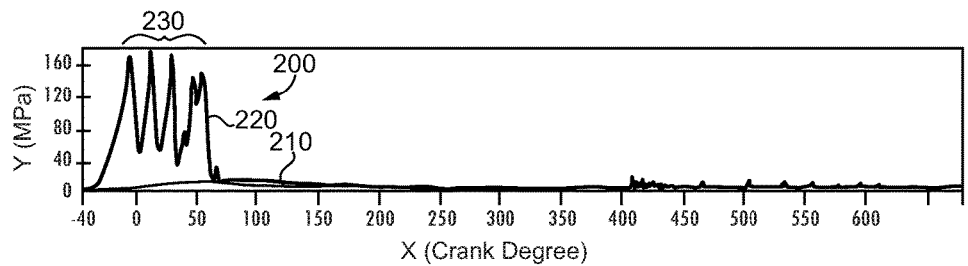
FIG. 4 is a graph illustrating rocker pressure in two different engine system operating modes.
Figure 5:
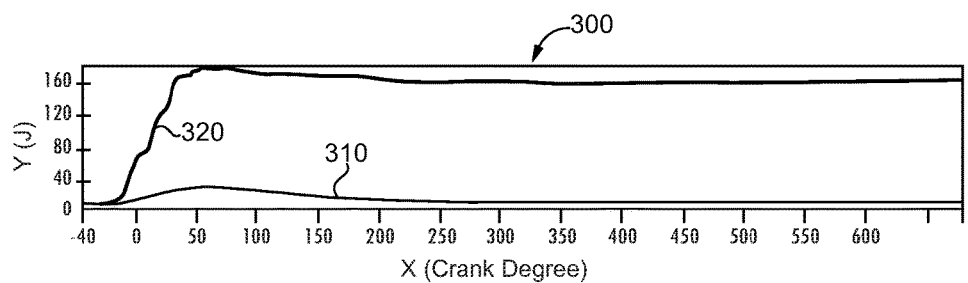
FIG. 5 is a graph illustrating rocker energy in two different engine system operating modes.
Figure 6:
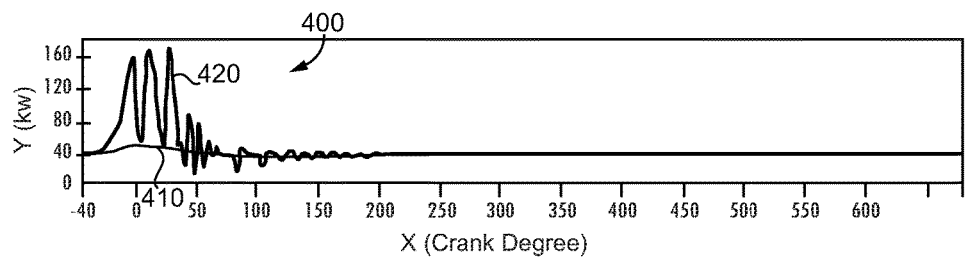
FIG. 6 is a graph illustrating rocker power in two different engine system operating modes.

Referring now to FIG. 4, there is shown a graph 200 illustrating a pressure such as a rocker arm pressure (MPa) that might be observed where plunger 46 pressurizes fuel and the pressurized fuel is dumped to a low pressure space 37 in the trace at 220, in comparison with operation of plunger 46 with spill valve 48 maintained open at 210. Crank angle degrees are shown on the X-axis, and pressure is shown on the Y-axis. A plurality of rocker pressure peaks are shown at 230, such as might be observed for a four pressurization event, where fuel pressure is spilled intermittently during a plunger pressurization stroke. Multiple pressurizations and spills or dumps can be employed, for example, in instances where internal pressure in fuel pump 44 might otherwise be expected to get too high and potentially lead to component failure or performance degradation. The relatively modest rise in trace 210 peaking just after 50 crank angle degrees is attributable to flow restriction by spill valve 48 itself and other internal plumbing features as fuel is pushed out of fuel injector 40. No fuel injection occurs in the illustrated example. At FIG. 5, there is shown rocker energy (Joules) in a graph 300 with crank angle degrees on the X-axis, and energy on the Y-axis. A trace 310 illustrates rocker energy that might be observed where non-parasitically loaded mode operation and no fuel injection is employed, analogous to FIG. 4. A trace 320 illustrates what might be observed where the four pressurization event and intermittent spilling as in FIG. 4 is employed. It can be noted the general correspondence between a stepped profile in trace 320 and peaks in trace 220. It will be appreciated that the rocker energy, and other parameters, can depend not only upon the energy associated with driving plunger 46 to pressurize fuel but also to compress a biasing spring that returns plunger 46 in an intake stroke. FIG. 6 includes another graph 400 that illustrates example instantaneous rocker power consumed that might be observed during the engine system operation depicted in FIG. 4 and FIG. 5. A trace 420 shows the four pressurization event with intermittent spilling, whereas a trace 410 illustrates operation without such dumping of pressurized fuel. No fuel injection occurs in either case.

INDUSTRIAL APPLICABILITY

Figure 7:
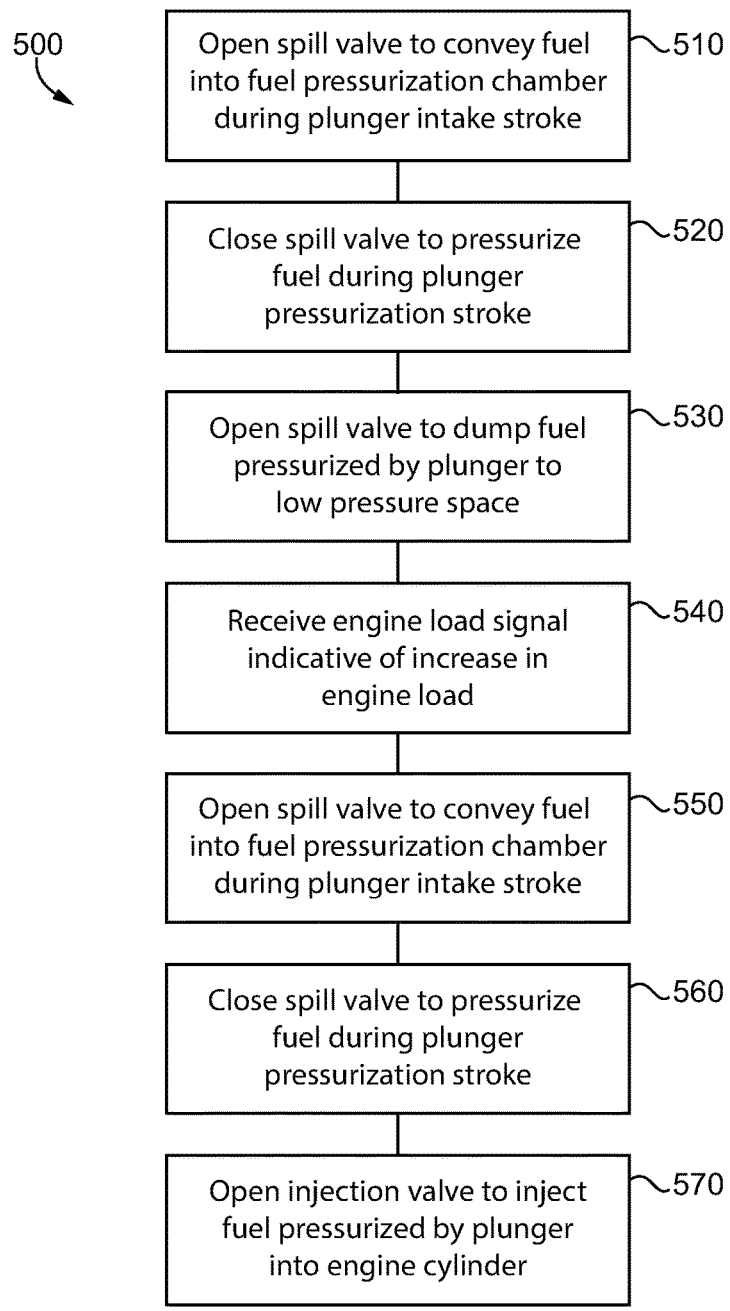
FIG. 7 is a flowchart illustrating example methodology and control logic flow, according to one embodiment.

Referring to the drawings generally, but in particular now to FIG. 7, there is shown a flowchart 500 illustrating example methodology and control logic flow according to the present disclosure. At a block 510, electronic control unit 54 can command opening spill valve 48 to convey fuel into fuel pressurization chamber 86 during an intake stroke of plunger 46. From block 510 the process may advance to block 520 where electronic control unit 54 commands spill valve 48 to close to pressurize fuel during the pressurization stroke of plunger 46. From block 520, the logic can advance to a block 530 where electronic control unit 54 commands opening spill valve 48 to dump fuel pressurized by plunger 46 to low pressure space 37.

Blocks 510, 520, and 530 can be understood to include operating engine system 10 in parasitically loaded mode 62. At a block 540, electronic control unit 54 can receive an engine load signal indicative of an increase in engine load. As discussed herein, the engine load signal could be a signal produced by sensor 66, that is based on a requested or observed increase in a power output demand of electric generator 38. It will be appreciated that requested engine load or a change in engine load can be determined, observed, or inferred, for example, in a number of different ways. The requested increase in engine load can include a request to transition engine system 10 from operating at an idle engine load to operating at a higher engine load. From block 540, the logic can advance to a block 550 to command opening spill valve 48 to convey fuel into fuel pressurization chamber 86 during, or potentially just prior to, an intake stroke of plunger 46. From block 550, the logic can advance to a block 560 to command closing spill valve 48 to pressurize fuel during a pressurization stroke of plunger 46. From block 560, the logic can advance to a block 570 to command opening injection valve 42 to inject fuel pressurized by plunger 46 into the corresponding engine cylinder 16.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of operating a turbocharged engine system comprising:
    varying a position of a spill valve such that fuel pressurized by a fuel pump in the engine system is dumped by way of the spill valve to a low pressure space;
    parasitically loading the engine system by way of the varying of the position of the spill valve;
    increasing an engine load of the engine system; and
    limiting turbocharger lag during the increasing of an engine load of the engine system by way of exhaust energy produced in response to the parasitic loading of the engine system.

2. The method of claim 1 wherein the increasing of an engine load of the engine system includes transitioning the engine system from operating at an idle engine load to operating at a higher engine load.

3. The method of claim 2 wherein the transitioning of the engine system occurs in response to an increased power output demand of an electric generator in the engine system.

4. The method of claim 2 wherein the varying of the position of a spill valve further includes opening the spill valve during a pressurization stroke of a plunger in the fuel pump.

5. The method of claim 4 further comprising opening the spill valve during an intake stroke of the plunger to convey fuel into the fuel pump, and wherein the varying of a position of a spill valve further includes varying the position of the spill valve in response to energizing or de-energizing an electrical spill valve actuator.

6. The method of claim 4 wherein the varying of a position of a spill valve further includes opening the spill valve a plurality of times in an engine cycle so as to dump fuel pressurized by the fuel pump a plurality of times in the engine cycle.

7. The method of claim 4 further comprising varying a position of an injection valve so as to inject fuel pressurized by the fuel pump into an engine cylinder in the engine system during the operating of the engine system at the higher engine load.

8. The method of claim 7 wherein the varying of a position of an injection valve further includes varying the position so as to inject fuel pressurized by the fuel pump into the engine cylinder during the operating of the engine system at the idle engine load.

9. The method of claim 7 further comprising holding the injection valve closed throughout an engine cycle during the operating of the engine system at the idle engine load.

10. The method of claim 2 further comprising firing at least one of a plurality of cylinders in the engine system, and skip firing at least one of the plurality of cylinders in the engine system, during the operating of the engine system at the idle engine load.

11. An engine control system comprising:
    an electronic control unit structured to vary a position of a spill valve between a closed position at which the spill valve blocks fluid communication between a fuel pump in the engine system and a low pressure space, and an open position;
    the electronic control unit being further structured to:
        operate the engine system in a parasitically loaded mode by way of commanding varying the position of the spill valve between the closed position and the open position in a first timing pattern, such that fuel pressurized by the fuel pump is dumped to the low pressure space;
        operate the engine system in a second mode by way of commanding varying the position of the spill valve between the closed position and the open position in a second timing pattern;
        receive an engine load signal indicative of an increase in engine load of the engine system;
        switch the engine system from operating in the parasitically loaded mode to operating in the second mode in response to the engine load signal; and
        limit turbocharger lag in the engine system during increasing the engine load by way of exhaust energy produced in response to parasitic loading of the engine system during operation of the engine system in the parasitically loaded mode.

12. The engine control system of claim 11 wherein the first timing pattern includes a spill valve opening timing that occurs during a pressurization stroke of a plunger in the fuel pump.

13. The engine control system of claim 12 wherein the first timing pattern further includes a plurality of spill valve opening timings during the pressurization stroke of the plunger.

14. The engine control system of claim 11 wherein the engine load signal is indicative of an increase in engine load of the engine system from an idle engine load to a higher engine load.

15. The engine control system of claim 11 wherein the electronic control unit is further structured to:
    vary a position of an injection valve in the engine system between a closed position at which the injection valve blocks a closing hydraulic surface of an outlet check from a low pressure space, and an open position; and
    command varying of the position of the injection valve so as to inject fuel pressurized by the fuel pump into an engine cylinder in the engine system.

16. The engine control system of claim 15 wherein the electronic control unit is further structured to command varying of the position of the injection valve so as to inject fuel pressurized by the fuel pump into the engine cylinder during operation of the engine system in the parasitically loaded mode.

17. The engine control system of claim 15 wherein the electronic control unit is further structured to command holding the injection valve closed during operation of the engine system in the parasitically loaded mode.

18. An engine system comprising:
   an engine including an engine housing having a plurality of engine cylinders formed therein, and each of an exhaust manifold and an intake manifold structured to fluidly connect with the plurality of engine cylinders;
   a turbocharger having a turbine and a compressor;
   a plurality of fuel injectors each associated with one of the plurality of engine cylinders and having an injection valve;
   a plurality of fuel pumps each associated with one of the plurality of fuel injectors and having a pumping element and a spill valve movable between a closed position where the spill valve blocks the pumping element from a low pressure space, and an open position;
   an electronic control unit in control communication with each of the plurality of fuel injectors and each of the plurality of fuel pumps;
   the electronic control unit being structured to:
      operate the engine system in a parasitically loaded mode by way of commanding varying a position of the spill valve in at least one of the plurality of fuel pumps between the closed position and the open position, such that fuel pressurized by the corresponding fuel pump is dumped to the low pressure space;
      receive an engine load signal indicative of an increase in engine load of the engine system;
      switch the engine system from operation in the parasitically loaded mode to operation in a second mode in response to the engine load signal; and
      limit turbocharger lag in the engine system during the increase in the engine load by way of exhaust energy produced in response to parasitic loading of the engine system during operation of the engine system in the parasitically loaded mode.

19. The engine system of claim 18 further comprising an electric generator coupled with the engine.

20. The engine system of claim 19 wherein the engine load signal is indicative of requested transitioning of the engine system from operation at an idle engine load to operation at a higher engine load in response to an increased power output demand on the electric generator.

\* \* \* \* \*